United States Patent
Hermanson et al.

(10) Patent No.: US 6,567,512 B1
(45) Date of Patent: May 20, 2003

(54) ELECTRONIC PROGRAMMER FOR TELEPHONES WITH AUTO-DIAL

(75) Inventors: Spencer L. Hermanson, San Jose, CA (US); William G. Marks, San Jose, CA (US); Mario E. Jauregui, San Bruno, CA (US); Charles R. Jackson, San Jose, CA (US); Maxim Bakaleynik, San Jose, CA (US)

(73) Assignee: Teledex Corporation, San Jose, CA (US)

( * ) Notice: Subject to any disclaimer, the term of this patent is extended or adjusted under 35 U.S.C. 154(b) by 0 days.

(21) Appl. No.: 09/366,747

(22) Filed: Aug. 4, 1999

(51) Int. Cl.[7] .................................................. H04M 3/42
(52) U.S. Cl. ............... 379/216.01; 379/40; 379/355.05; 379/355.06; 379/428.01; 379/428.04
(58) Field of Search ....................... 379/355.01, 355.02, 379/355.03, 357.03, 357.04, 368, 369, 420.04, 428.01, 428.04, 201.01, 201.03, 216.01, 40

(56) References Cited

U.S. PATENT DOCUMENTS

| | | | | |
|---|---|---|---|---|
| 4,012,600 A | * | 3/1977 | Warren | 379/357.04 |
| 4,845,748 A | * | 7/1989 | Bohannon | 379/368 |
| 4,941,172 A | * | 7/1990 | Winebaum et al. | 379/357.03 |
| 5,099,507 A | * | 3/1992 | Mukai et al. | 340/7.1 |
| 5,119,417 A | * | 6/1992 | Suzuki et al. | 379/354 |
| 5,181,744 A | * | 1/1993 | Betheil | 283/56 |
| 5,283,816 A | * | 2/1994 | Gomez Diaz | 379/40 |
| 5,481,595 A | * | 1/1996 | Ohashi et al. | 379/88.27 |
| 5,495,525 A | * | 2/1996 | Walker et al. | 379/357.04 |
| 5,818,930 A | * | 10/1998 | Mark | 379/444 |
| 6,157,711 A | * | 12/2000 | Katz | 379/265.01 |
| 6,208,733 B1 | * | 3/2001 | Lee | 379/420.04 |

* cited by examiner

Primary Examiner—Harry S. Hong
Assistant Examiner—Bing Bui
(74) Attorney, Agent, or Firm—Thelen Reid & Priest LLP; Robert E. Krebs (57) ABSTRACT

An electronic programmer for the auto-dial functions of a telephone comprises an apparatus which electrically connects the rows and columns lines on the keyboard of a telephone so as to mimic the pressing the buttons on the telephone keypad.

23 Claims, 7 Drawing Sheets

FIG. 5C

ELECTRONIC PROGRAMMER FOR TELEPHONES WITH AUTO-DIAL

BACKGROUND OF THE INVENTION

The present invention relates to the programming of telephones with auto-dial buttons.

Many telephones can be manually programmed with auto-dial buttons so that a telephone number can be automatically dialed. These auto-dial numbers can be emergency response numbers, or frequently dialed telephone numbers. Typically, the user can manually program these auto-dial numbers. In one case, to program an auto-dial number, the user presses the "memory" button, types in the desired phone number and then presses an auto-dial button to be associated with that number.

Hotels frequently use telephones with the auto-dial functions so that the front desk and other building services can be quickly accessed. With large hotels, this produces the problem that a relatively large number of phones need to be manually programmed. This can take a lot of time and can result in a relatively large number of human errors in the auto-dial programming. For this reason, mechanical auto-dial programmers have been produced. These mechanical programmers push the buttons in the telephone in the desired sequence to program the auto-dial buttons. These mechanical programmers are difficult to adjust for different phone shapes. The telephone key pad must be correctly oriented underneath the mechanical programmer for the mechanical programming to work correctly. Slight design changes or minor variations in phone manufacture can produce difficulty in alignment of the keypad with the mechanical auto-dial programmers. In addition, if the position of the buttons are changed for a new telephone design, a new mechanical programmer must be produced.

It is desired to have an improved method of programming telephones having the auto-dial function.

SUMMARY OF THE INVENTION

The present invention is an electronic programmer for use with telephones having an auto-dial function. Typically, telephone keyboards have row and column lines which are electrically connected when buttons are pressed on the telephone. A dialer chip in the telephone detects the electrical connection between the row and column lines. The present invention is an electronic programmer that interconnects row and column lines of the telephone to mimic the pressing of buttons of the telephone without requiring the buttons to be pressed.

In one embodiment, this is done by using an external electrical connector on the telephone keyboard that allows access to the row and column lines of the telephone keyboard. An electronic programmer is connected to this connector and selectively connects the row and column lines of the keyboard electronically together so as to mimic the pressing of buttons. This electrical programming is much more convenient than the mechanical programming and is not dependent upon the size, orientation or shape of the telephone.

In one embodiment, the present invention comprises an electronic programmer unit including a connector which is electrically connected to the row and column lines of the telephone keyboard. This connector is preferably a multi-pin connector which can be connected to a separate multi-pin external connector on the keyboard of the telephone. The multi-pin connector on the telephone keyboard is connected to the row and column lines. The electrical connector of the programming unit is connected to an interconnect unit which is adapted to selectively connect row and column lines received from the connector. The interconnect unit can comprise a number of pass transistors. A control unit is operatively connected to the interconnect unit. The control unit controls the selection of the electrical connections to mimic the pressing of the buttons on the telephone.

Another embodiment of the present invention concerns a method of programming a telephone. The method steps include connecting an electronic programmer to the telephone such that the row and column lines of the telephone keyboard are electrically accessable by the electronic programming unit. The next step involves electrically connecting row and column lines in order to mimic the pressing of a sequence of buttons on the telephone such that the telephone is programmed with an auto-dial number.

Another embodiment of the present invention concerns a telephone having a keyboard with a row and column lines. The row and column lines are connected to an external access connector that allows external electrical access to the row and column lines. The external access connector is separate from the internal connector which connects the keyboard to a dialer chip within the telephone. In one embodiment, the external access connector can be covered with a face plate or the like after the telephone is programmed with the auto-dial numbers.

DETAILED DESCRIPTION OF THE PREFERRED EMBODIMENT

Figure 1:
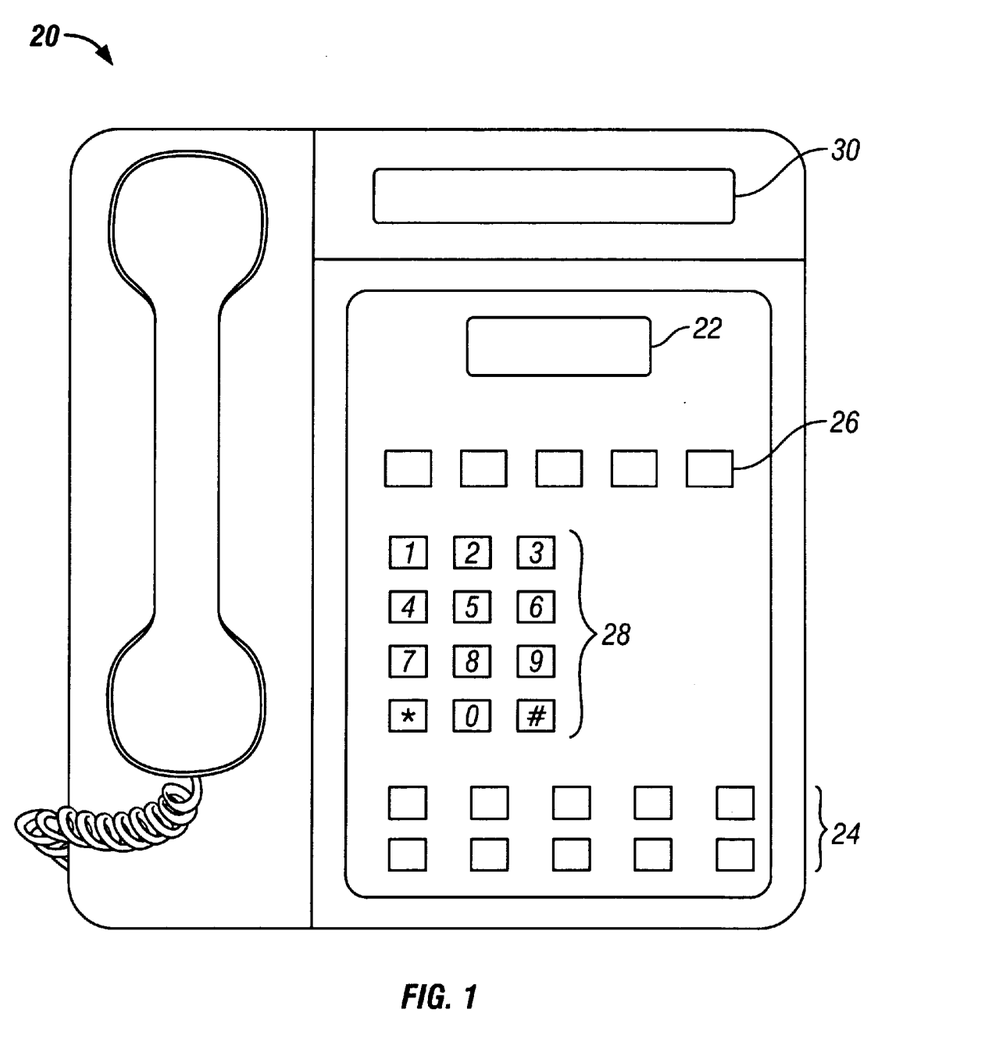
FIG. 1 is a diagram of a telephone having an external access connector of the present invention.
Figure 2:
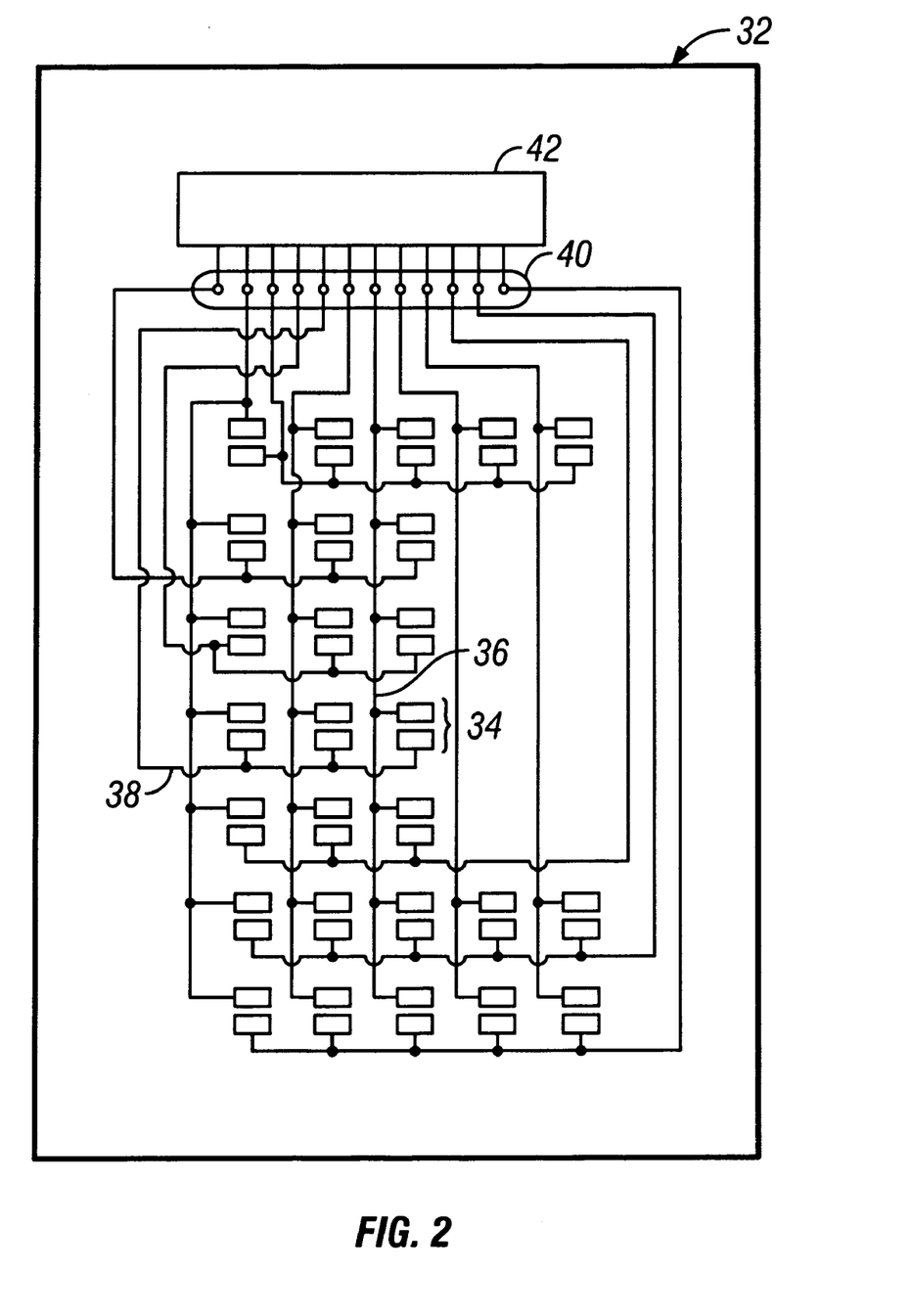
FIG. 2 is a diagram of a telephone keyboard including an external access connector for use with the present invention.

FIG. 1 is a diagram of a telephone unit 20 for use with the present invention. The telephone unit has a number of buttons which can be pressed to dial telephone numbers. In a preferred embodiment, an external connector device 22 on the telephone keyboard allows access to the row and column lines on the keyboard. An example of keyboard for the telephone is shown in FIG. 2 below. Telephone 20 includes a number of auto-dial buttons 24 that can be associated with a memorized telephone number. By pressing one of these auto-dial buttons, the number associated with that button is automatically dialed by the telephone. In one embodiment, to program the telephone 20 a "memory" button 26 is pressed. The telephone number is coded in using the keypad 28 and then associated with one of the auto-dial buttons 24. The telephone 20 can have display screen 30.

FIG. 2 is a diagram that illustrates a keypad of one embodiment of the present invention. The keypad 32 includes a number of connection regions, such as connection region 34. Connection region 34 is positioned beneath a button of the telephone. When a button is pressed, a resistive element on the bottom of the button electrically connects between the two halves of the connection region, electronically connecting lines on the keyboard. For example, connecting the two halves of connection region 34 electrically connects column line 36 and row line 38.

The electrical connection between lines on the keyboard is detected by a dialer chip (not shown). The keyboard 32 is connected to the dialer chip using a first connection 40. A number of column and row lines are provided on the keyboard 32. A pair of row and column lines uniquely identifies each of the buttons. When the buttons of the telephone are pressed, the dialer chip on the telephone can detect the electrical connection between a specific row and column line. The lines on keyboard 32 are called row and column lines to describe the logical arrangement of the lines as is conventional in the telephone arts. As shown in FIG. 2, the row and column lines need not be straight or even linear.

The keyboard 32 is preferably made of a PC board material with a variety of electrical traces formed there upon to form the row and column lines. The contact region 34 includes an exposed metal surface.

In the preferred embodiment of the present invention, an external connector 42 is positioned on the keyboard 32. The external connector 42 allows access to the row and column lines of the keyboard 32 thus allows the connection of the row and column lines to an external electronic programmer.

Figure 3:
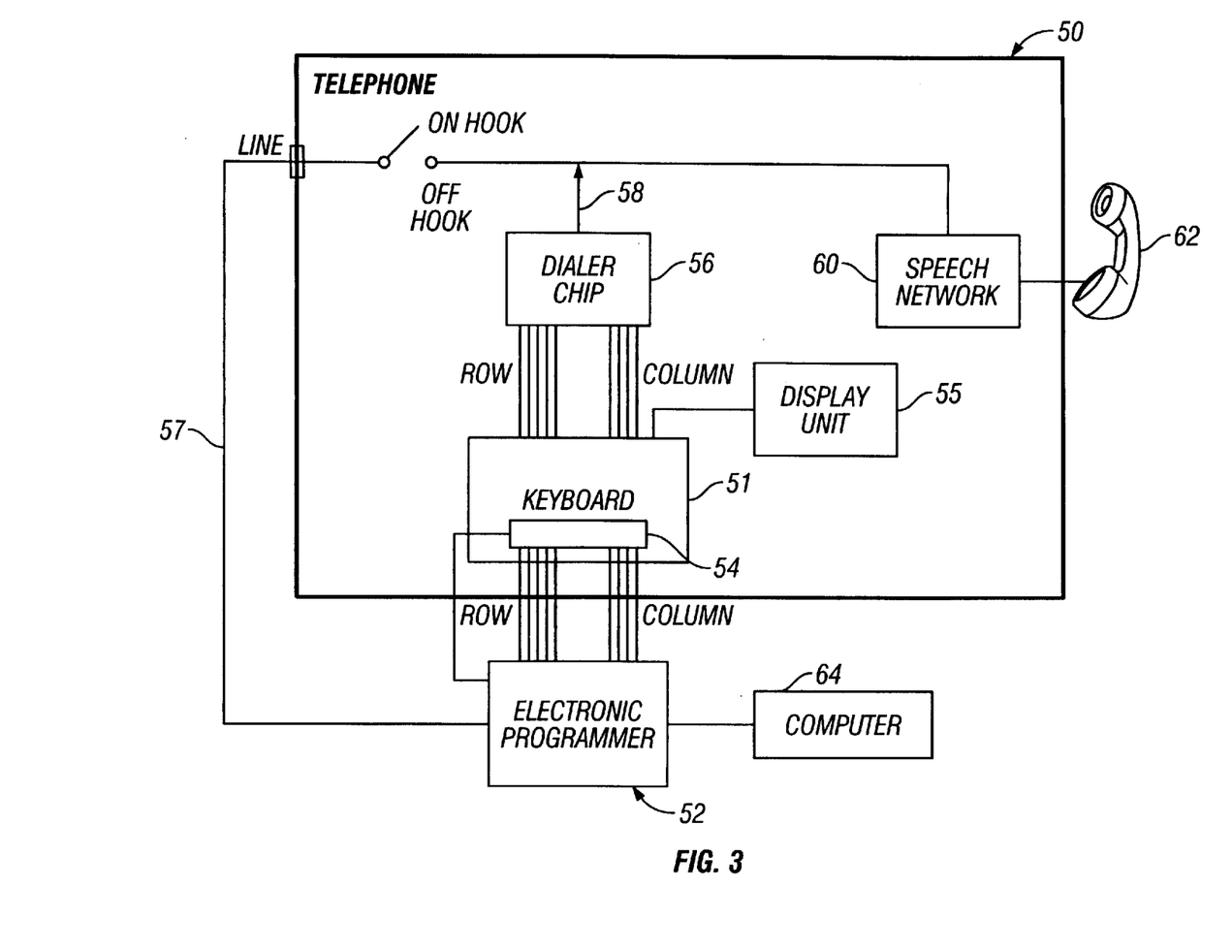
FIG. 3 is a diagram of a telephone connected to a electronic programmer for electronic programming of the auto-dial functions.

FIG. 3 is a diagram that shows a telephone 50 and an electronic programmer 52 for use with the present invention. The telephone 50 includes a keyboard 51 including an external connector 54. The keyboard 51 is connected to a dialer chip 56 which can be one of a number of dialer chips that implement the auto-dial function. Examples of such a dialer chip include those manufactured by Holtek, Samsung, Phillips, and HMC. The dialer chip 56 detects an electrical connection between row and column lines at the keyboard 51. The dialer chip produces a tone across the line 58 when a number is dialed. The dialer chip 56 also has an internal memory which can store auto-dial numbers. By interpreting the different connections between the row and columns (and thus the pressed buttons) the dialer chip can send out tones for the dialed number, recover a telephone number from a memory when an auto-dial button is pressed, and store an auto dial number into memory. The telephone 50 also includes a speech network 60 attached to an handset 62, and/or a hands-free speaker phone (not shown).

As described above, in a preferred embodiment, the keyboard 51 has an external connector 54 which allows the connection to an electronic programmer 52. the electronic programmer 52 can electrically connect row and columns to mimic the pressing of buttons on the telephone 50. The electronic programmer 52 includes a controller unit which can cause the programming of different auto-dial numbers. In a preferred embodiment, the electronic programmer 52 is also connected by the output line with connector 57. This allows the electronic programmer unit 52 to automatically detect the auto-dial numbers (that is the tones sent across line 58 from the dialer chip 56) and determine whether the correct telephone number has been programmed into the auto-dial button. In one embodiment of the present invention, the control unit of the electronic programmer 52 interfaces with an external computer 64.

Figure 4:
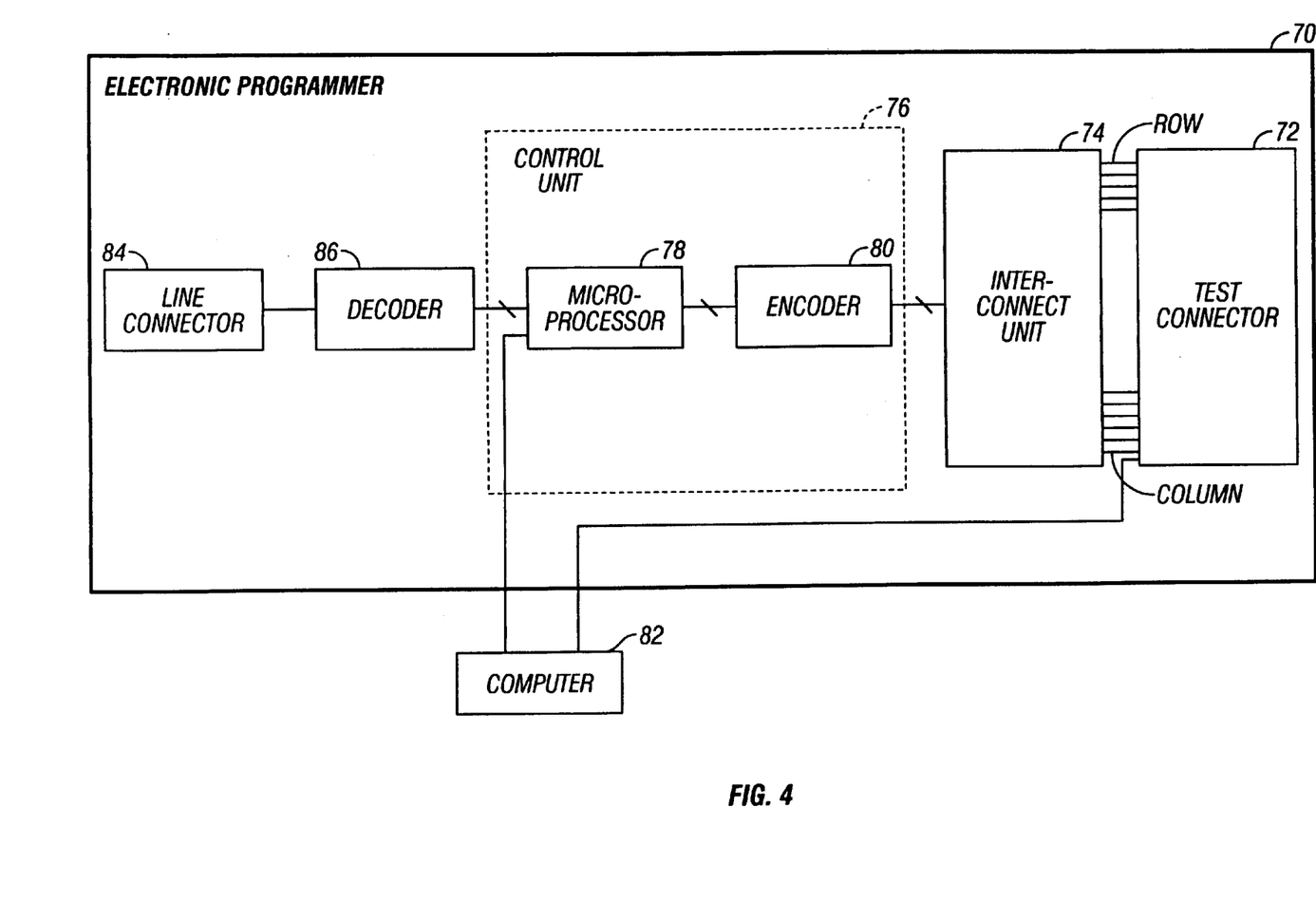
FIG. 4 is a diagram of the electronic programmer of one embodiment of the present invention.

FIG. 4 illustrates details of one embodiment of an electronic programmer unit 70 of the present invention. The electronic programmer unit 70 includes a test connector 72. The test connector 72 may include a bus connector to connect to the external connector on the telephone. The different row and column lines are then sent to an interconnect unit 74. Row lines and column lines can be interconnected as controlled by control unit 76. In one embodiment, the control unit 76 can be a microprocessor 78 connected to an encoder chip 80. Alternately, the control unit 76 can be a microprocessor by itself or a dedicated logic chip. The microprocessor 78 can be connected to a computer. Computer 82 allows the inputting of the telephone number data. The line connector 84 is provided to allow the output of the telephone to be sent back to the electronic programmer for testing. The decoder 86 decodes the tones from the dialer chip of the telephone. This decoded indication is sent to the microprocessor 78 which passes the information to the computer which determines whether the correct phone number is stored. In one embodiment of the present invention, additional connections can be produced in the electronic programmer and the telephone. Looking again at FIG. 3, additional connections from the keyboard 51 can include data to be sent to the display unit 55. The additional data can then be sent from the electronic programmer 52 to the display unit 55. This can allow for the concurrent electronic programming of the display unit 55.

Figure 5A:
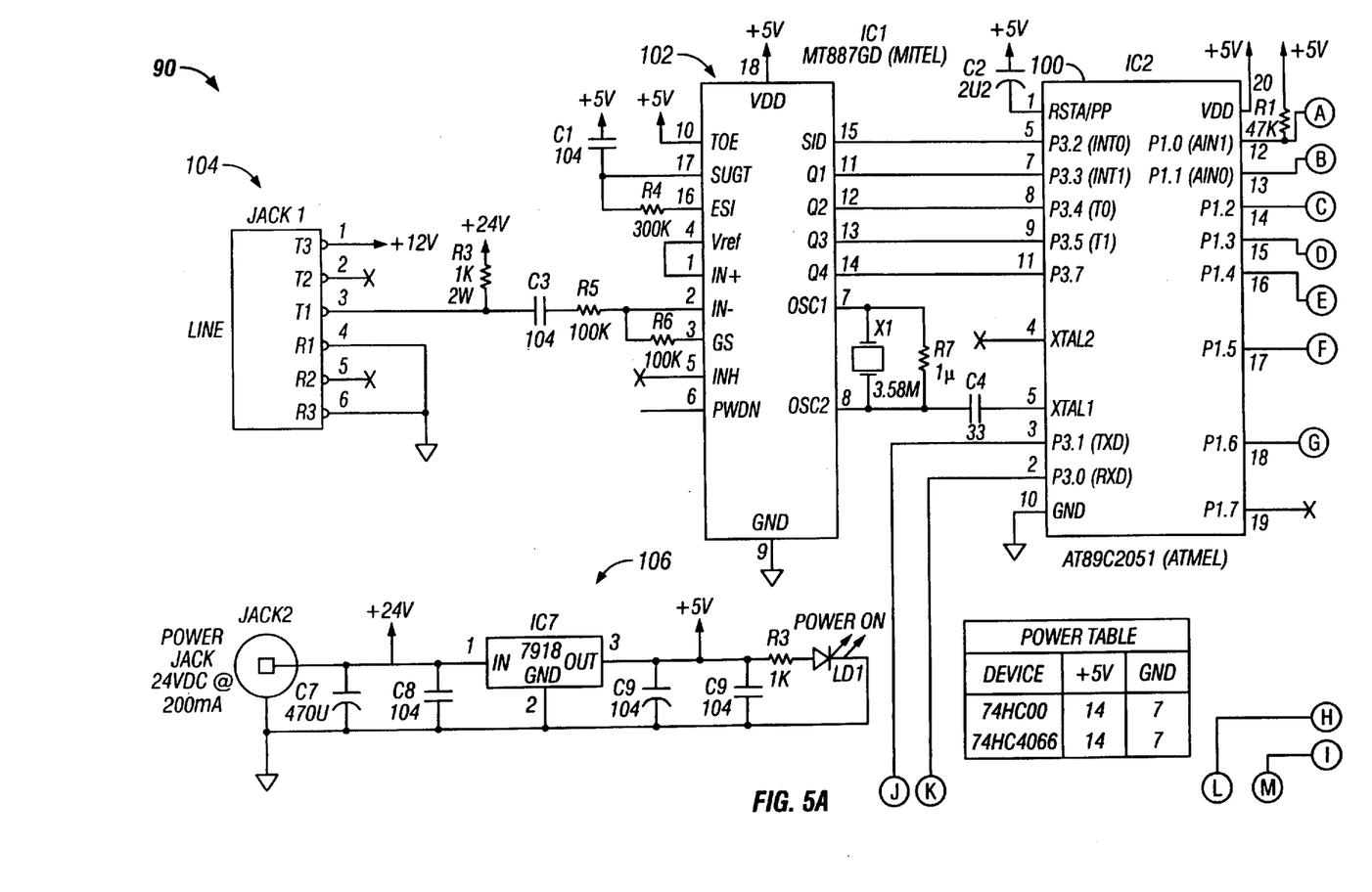
FIG. 5 is a detailed diagram of one embodiment of an electronic programmer.
Figure 5B:
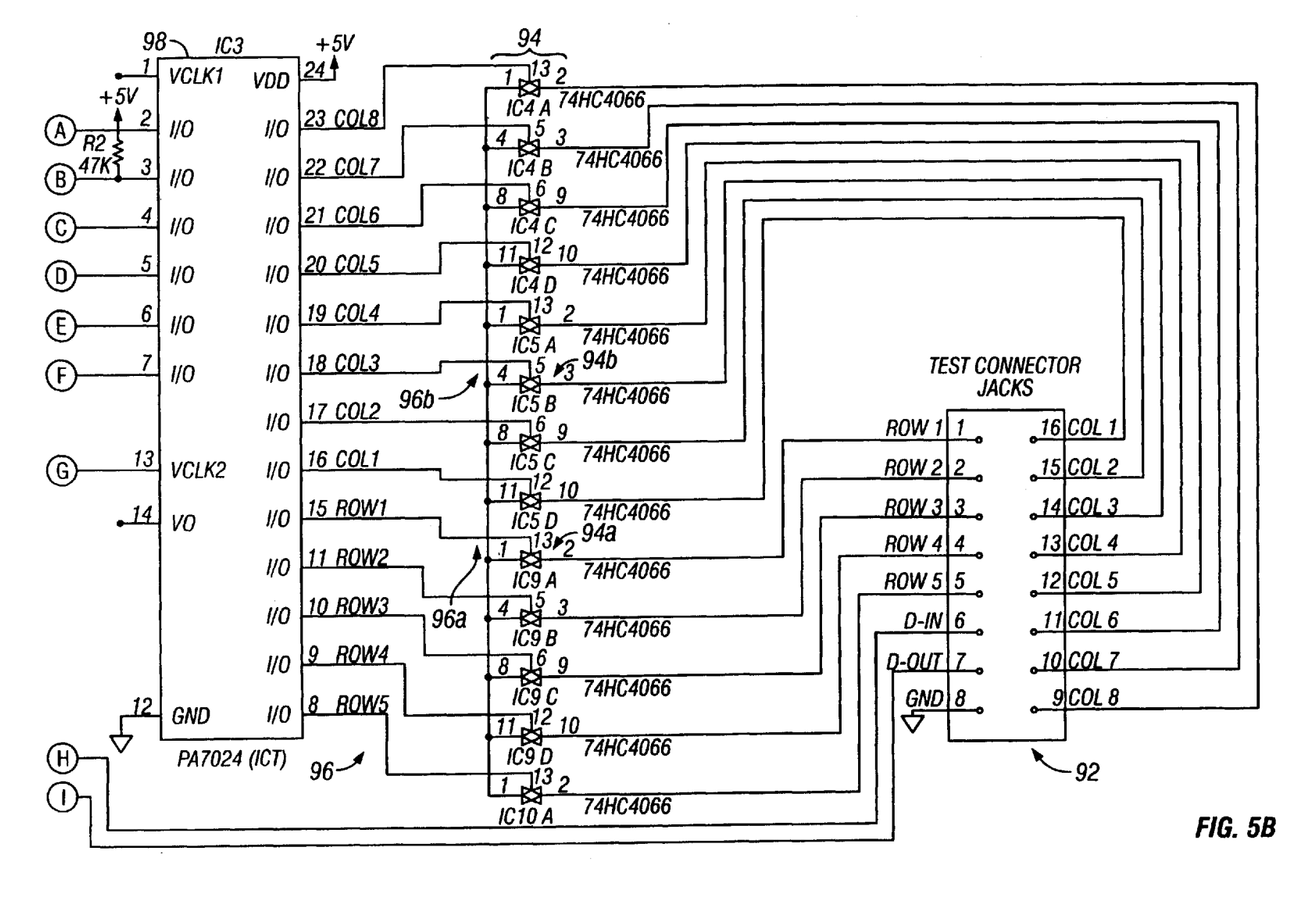
Figure 5C:
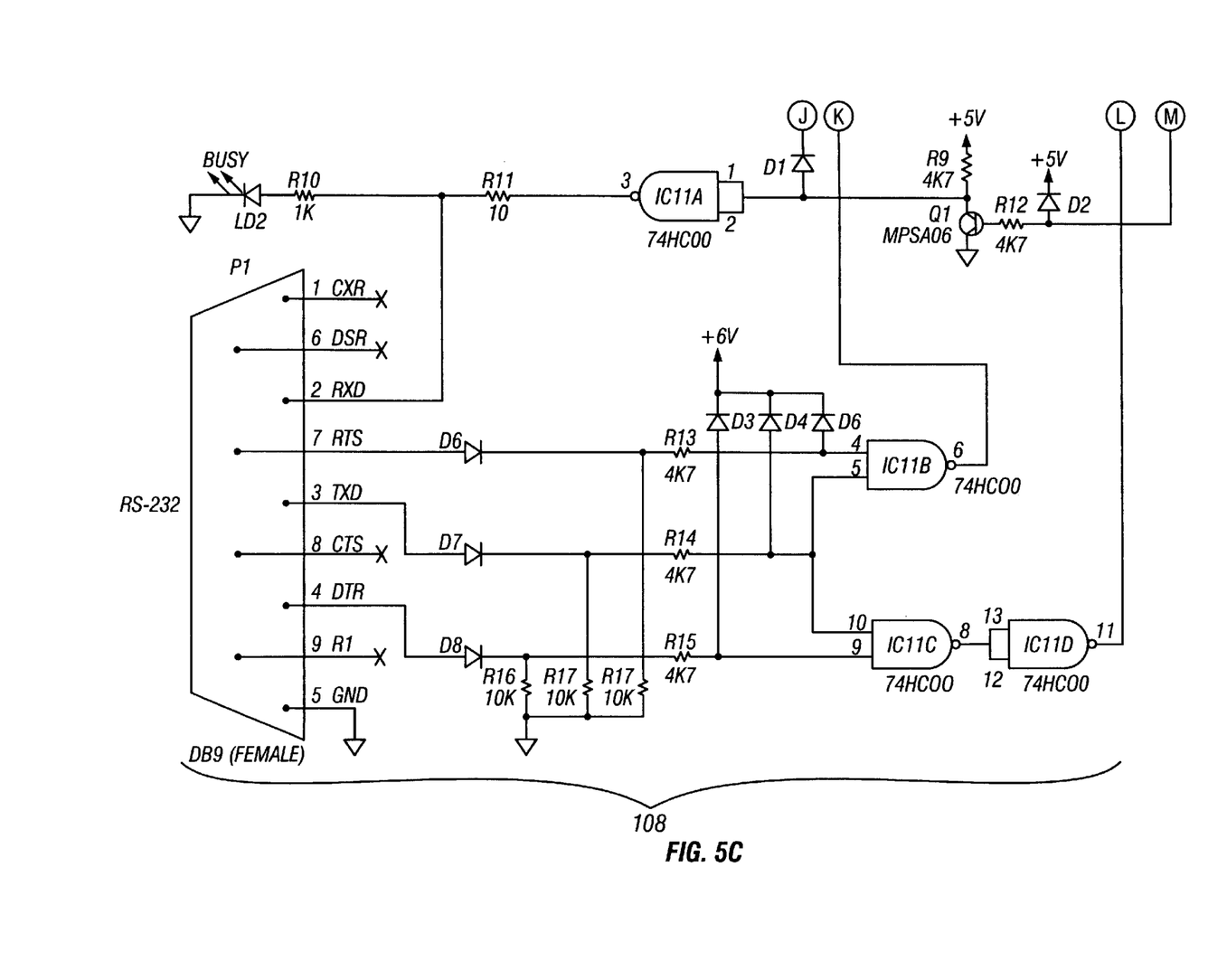

FIG. 5 contains details of one embodiment of the electronic programmer of the present invention. The electronic programmer 90 includes a test connector 92. The test connector 92 is connected to an interconnect unit 94 which is comprised of a number of pass transistors. By selecting a pair of pass transistors, row and column lines are interconnected. There is typically some resistance caused by the pass transistors which is comparable to the resistance of a depressed button on a telephone.

The selection lines 96 select the pair of pass transistors to be turned on. For example, if row 1 is to be connected to column 3, pass transistors 94*a* and 94*b* are turned on by the selection lines 96*a* and 96*b*. The encoder unit 98 is connected to a microprocessor 100. The encoder unit 98 sends out selection line signals from an indication of the button selected. The microprocessor 100 is also connected to the decoder 102. The decoder 102 decodes the tones from the telephone via line connector 104 and thus can be used along with the microprocessor 100 to automatically test whether the correct telephone number is associated with a given auto-dial button. The system also includes a power unit 106 and a computer connector unit 108.

In one embodiment of the present invention, the microprocessor 100 via the encoder 98 will send instructions to the interconnect unit 94 to connect the row and column lines to indicate the "memory" button. The connections between the row and column lines are detected by the dialer chip in the telephone. The dialer chip in the telephone will then initiate the mode in which a telephone number is stored into the memory. The microprocessor 100 will then connect the row and column lines to mimic a sequence of telephone buttons being depressed for a given telephone number. Finally, the microprocessor 100 will connect the row and column lines associated with an auto-dial button.

At this time, the auto-dial number should be stored in the dialer chip of the telephone. The microprocessor 100 will then test the telephone by connecting row and column lines together to mimic the pressing of the auto-dial button. This will cause the telephone to send out a number of tones which correspond to the memorized telephone number. These tones will be detected by the decoder 102 and data sent to the microprocessor 100 for testing. As can be imagined, the electronic programmer 90 of the present invention can be used for efficiently programming telephones, especially guest telephones for use in hotels.

It would be appreciated by those of ordinary skill in the art that the invention can be embodied in other specific forms without departing from the spirit or central character thereof. The presently disclosed embodiments are therefor considered in all respect to be illustrative and not restrictive. The scope of the invention is illustrated by the appended claims rather than the foregoing description, and all changes that come within the meaning and scope of equivalence thereof are intended to be embraced herein.

We claim:

1. A programmer unit for a telephone comprising:
 a connector adapted to be electrically connected to row and column lines of a telephone keyboard;
 an interconnect unit adapted to selectively connect selected row and column lines received from the connector;
 a control unit operably connected to the interconnect unit, the control unit adapted to control the interconnect unit to electrically connect selected row and column lines in order to mimic the depressing of buttons on the telephone.

2. The programmer unit of claim 1, wherein the telephone includes an external connector unit which can be connected on the programmer unit.

3. The programmer unit of claim 1, wherein the control unit includes a microprocessor.

4. The programmer unit of claim 3, wherein the microprocessor is connected to an encoder.

5. The programmer unit of claim 3, wherein the microprocessor is connected to a computer.

6. The programmer of claim 1, further including a line unit which connects to the telephone, the line unit including a decoder which can decode the tones produced by the telephone dialer so that the control unit can test the programming of the telephone.

7. The programmer unit of claim 1, wherein the interconnect unit comprises a number of pass transistors.

8. A method of programming a telephone, the telephone being manually programmable, the method comprising:
 connecting an electronic programmer unit to a telephone such that the row and column lines of the telephone keyboard are electrically accessible by the electronic programmer unit;
 in the electronic programmer unit, selectively connecting selected row and column lines in order to mimic the depressing of a sequence of buttons on the telephone such that the telephone is electronically programmed.

9. The method of claim 8, wherein in the connecting step includes using an external connector at the keyboard of the telephone.

10. The method of claim 8, wherein the telephone has a dialer chip connected to the row and column lines of the keyboard and;
 wherein the connecting of row and column lines in the electronic programmer unit is detected by the dialer chip.

11. The method of claim 8, further comprising a testing step of testing whether an auto-dial button has been correctly programmed.

12. The method of claim 11, wherein the testing includes decoding the tones produced by the telephone in the electronic programmer unit.

13. The method of claim 8, wherein in the sequence of buttons which is mimicked by the electronic programmer unit in the selectively connecting step includes a telephone number.

14. The method of claim 13, wherein the sequence of buttons includes a auto-dial button.

15. The method of claim 14, wherein the sequence of buttons includes a memory button.

16. The method of claim 8, wherein the rows and columns are utterly connected through an interconnect unit.

17. The method of claim 16, wherein the interconnect unit comprises pass transistors.

18. A telephone comprising:
 a keyboard having electrically conductive lines arranged such that when a button is depressed at least two of the electrically conductive lines are electrically connected, the electrically conductive lines being logically arranged into row and column lines, each button being associated with one of the row and one of the column lines;
 a dialer chip electrically connected to the row and column lines, the dialer chip sensing the electrical connection between row and column lines to identify a depressed button; and
 an external access connector on the keyboard that allows external access to the row and column lines.

19. The telephone of claim 18, wherein the external access connector is hidden from the user after programming.

20. The telephone of claim 18, wherein the buttons have a resistive element on the bottom so as to electrically connect the row and column lines.

21. The telephone of claim 18, wherein the row and column lines are not completely straight.

22. The telephone of claim 18, wherein the auto-dial function of the telephone is electronically programmable through the external access connector.

23. The telephone of claim 22, wherein the external connector allows the programming of the auto-dial functions of the telephone.

* * * * *